US012448504B2

(12) United States Patent
Karjala et al.

(10) Patent No.: US 12,448,504 B2
(45) Date of Patent: Oct. 21, 2025

(54) Ziegler-Natta CATALYZED POLYETHYLENE RESINS AND FILMS INCORPORATING SAME

(71) Applicant: Dow Global Technologies LLC, Midland, MI (US)

(72) Inventors: Teresa P. Karjala, Lake Jackson, TX (US); Kurt F. Hirsekorn, Sugar Land, TX (US); Marlos Giuntini de Oliveira, São Paulo (BR); Gregory J. Brennan, Angleton, TX (US); Elva L. Lugo, Manvel, TX (US); Yongchao Zeng, Houston, TX (US); Brayden E. Glad, Manvel, TX (US); Jon W. Hobson, Lake Jackson, TX (US); Linfeng Chen, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 304 days.

(21) Appl. No.: 17/615,352

(22) PCT Filed: May 29, 2020

(86) PCT No.: PCT/US2020/035208
§ 371 (c)(1),
(2) Date: Nov. 30, 2021

(87) PCT Pub. No.: WO2020/243487
PCT Pub. Date: Dec. 3, 2020

(65) Prior Publication Data
US 2022/0220292 A1 Jul. 14, 2022

Related U.S. Application Data

(60) Provisional application No. 62/855,418, filed on May 31, 2019.

(51) Int. Cl.
C08L 23/08 (2025.01)
C08F 210/02 (2006.01)
C08F 210/16 (2006.01)
C08J 5/18 (2006.01)
C08L 23/06 (2006.01)
C08L 23/0807 (2025.01)

(52) U.S. Cl.
CPC ........ *C08L 23/0815* (2013.01); *C08F 210/02* (2013.01); *C08F 210/16* (2013.01); *C08J 5/18* (2013.01); *C08L 23/06* (2013.01); *C08L 23/08* (2013.01); *C08L 23/0807* (2013.01); *C08J 2323/06* (2013.01); *C08J 2323/08* (2013.01); *C08J 2423/06* (2013.01); *C08L 2203/16* (2013.01); *C08L 2205/025* (2013.01); *C08L 2207/066* (2013.01)

(58) Field of Classification Search
CPC .. C08L 23/08; C08L 23/0807; C08L 23/0815; C08F 210/16; C08J 2323/06; C08J 2323/08; C08J 2323/16
See application file for complete search history.

(56) References Cited

U.S. PATENT DOCUMENTS

| | | | |
|---|---|---|---|
| 3,645,992 | A | 2/1972 | Elston |
| 3,914,342 | A | 10/1975 | Mitchell |
| 4,076,698 | A | 2/1978 | Anderson et al. |
| 5,272,236 | A | 12/1993 | Lai et al. |
| 5,278,272 | A | 1/1994 | Lai et al. |
| 5,582,923 | A | 12/1996 | Kale et al. |
| 5,773,155 | A | 6/1998 | Kale et al. |
| 8,822,601 | B2 | 9/2014 | Karjala et al. |
| 8,871,887 | B2 | 10/2014 | Karjala et al. |
| 8,916,667 | B2 | 12/2014 | Karjala et al. |
| 9,228,036 | B2 | 1/2016 | Berbee et al. |
| 9,255,160 | B2 | 2/2016 | Desjardins et al. |
| 9,765,160 | B2 | 9/2017 | Den Doelder et al. |
| 2003/0139546 | A1 † | 7/2003 | Jain |
| 2015/0148490 | A1 † | 5/2015 | Kapur |
| 2018/0172648 | A1 | 6/2018 | Cong et al. |
| 2019/0062540 | A1 † | 2/2019 | Den Doelder |

FOREIGN PATENT DOCUMENTS

| | | | | |
|---|---|---|---|---|
| EP | 0944669 | A1 | 9/1999 | |
| EP | 1023390 | A1 | 8/2000 | |
| EP | 3214115 | A1 * | 9/2017 | ............. B32B 27/06 |
| WO | 2015/200743 | A1 | 12/2015 | |
| WO | 2019231991 | A1 | 12/2019 | |

OTHER PUBLICATIONS

International Preliminary Report on Patentability, dated Jan. 19, 2022 pertaining to PCT/US2020/035208, 8 pages.
Communication Pursuant to Rules 161(1) and 162 EPC, dated Jan. 14, 2022 pertaining to EP 20733175.2, 3 pages.
SG Search Report and Written Opinion dated Aug. 17, 2023, pertaining to SG Patent Application No. 11202112728R, 8 pages.
Communication pursuant to Article 94(3) EPC, dated Jun. 14, 2023, pertaining to European Patent Application No. 20733175.2 6 pages.
Chinese Office Action dated Feb. 15, 2023, pertaining to Chinese Patent Application No. 202080045700.6 9 pages.
Chinese Search Report dated Feb. 15, 2023, pertaining to Chinese Patent Application No. 202080045700.6 3 pages.
Thailand Office Action dated May 1, 2023, pertaining to Thai Patent Application No. 2101007249 4 pp. 8.

(Continued)

*Primary Examiner* — Joseph S Del Sole
*Assistant Examiner* — David L Miller
(74) *Attorney, Agent, or Firm* — Dinsmore & Shohl LLP

(57) ABSTRACT

Embodiments of the present disclosure are specifically related to LLDPE compositions produced from heterogeneous procatalyst compositions and blown and cast films incorporating these LLDPE compositions.

13 Claims, No Drawings

(56) References Cited

OTHER PUBLICATIONS

Brazil Office Action dated Sep. 4, 2023, pertaining to BR Patent Applicaton No. BR112021023227.3, 11 pgs.
Communication pursuant to Rule 114(2) EPC dated May 2, 2024, pertaining to EP Patent Application No. 20733175.2, 24 pgs.
International Search Report and Written Opinion issued by the European Patent Office acting as International Searching Authority for International Patent Application No. PCT/US2020/035208 dated Sep. 2, 2020 (14 total pages).
Communication pursuant to Article 94(3) EPC dated Oct. 4, 2024, pertaining to EP Patent Application No. 20733175.2, 4 pgs.
Singagore Office Action dated Aug. 13, 2024, pertaining to the SG Patent Application No. 11202112728R, 7 pgs.
Japanese Office Action dated Jun. 4, 2024, pertaining to JP Patent Application No. 2021-569922, 4 pgs.
Brazil Technical Report dated Jan. 21, 2025, pertaining to BR Patent Application No. BR112021023227.3, 8 pgs.
Korean Office Action dated Mar. 31, 2025, pertaining to KR Patent Application No. 10-2021-7042155, 18 pgs.
Brazilian Office Action dated Aug. 12, 2025, pertaining to BR Patent Application No. 112021023227.3, 4 pgs.
Brazilian Office Action dated Aug. 26, 2025, pertaining to BR Patent Application No. 112021023227.3, 4 pgs.

\* cited by examiner
† cited by third party

US 12,448,504 B2

Ziegler-Natta CATALYZED POLYETHYLENE RESINS AND FILMS INCORPORATING SAME

CROSS REFERENCE TO RELATED APPLICATIONS

This application is a national phase of PCT Application No. US 2020/035208 filed on May 29, 2020, which claims priority to U.S. Provisional Patent Application No. 62/855,418, filed on May 31, 2019, the entire disclosures of which is hereby are hereby incorporated by reference.

TECHNICAL FIELD

Embodiments of the present disclosure generally relate to linear low density polyethylene (LLDPE) compositions, and specifically relate to LLDPE compositions produced from heterogeneous procatalyst compositions and films incorporating these LLDPE compositions.

BACKGROUND

Olefin-based polymers such as ethylene-based polymers and propylene-based polymers are produced using various catalysts. The components of such catalysts used in the polymerization process of the olefin-based polymers are important factors contributing to the characteristics and properties of such olefin-based polymers.

Ethylene-based polymers are manufactured for use in a wide variety of articles. The polyethylene polymerization process can be varied in a number of respects to produce a wide variety of resultant polyethylene resins having different physical properties that render the various resins suitable for use in different applications. Hydrogen may also be added to the reactor. The catalysts for producing ethylene-based polymers may typically comprise a chromium-based catalyst, a Ziegler-Natta catalyst, and/or a molecular (either metallocene or non-metallocene) catalyst. Either periodically or continuously, part of the reaction mixture, including the polyethylene product formed, together with unreacted ethylene and one or more optional co-monomers, is removed from the reactor. The reaction mixture, when removed from the reactor, may be processed to remove the polyethylene product from the unreacted reactants, with the unreacted reactants typically being recycled back into the reactor. Alternatively, the reaction mixture may be sent to a second reactor, serially connected to the first reactor, where a second polyethylene fraction may be produced.

Conventional polymers produced by Ziegler-Natta catalysts generally contain relatively large amounts of high density fractions compared to molecular catalysts. This high density fraction precludes the polymer from achieving the optics and abuse properties required in some applications. Accordingly, there is a need for polymer having reduced high density fraction to allow for improvement in optical and abuse properties, such as dart impact, while not suffering a significant trade-off of mechanical strength and tear properties.

SUMMARY

The present embodiments meet these needs by producing LLDPE polymers with reduced high density fraction and improved optical and abuse properties without significant trade-off of mechanical strength and tear properties.

According to one embodiment of the present disclosure, a blown film comprising a linear low density polyethylene (LLDPE) polymer is provided. The LLDPE is the polymerized reaction product of ethylene monomer, and $C_3$-$C_{12}$ ethylene comonomer. The LLDPE has a density from 0.904 to 0.925 g/cc; a melt index ($I_2$) of 0.5 to 1.5 g/10 minutes when measured according to ASTM1238 under a load of 2.16 kg at a temperature of 190° C.; a melt flow ratio (I10/I2) of 6.5 to 7.6, wherein $I_{10}$ is measured according to ASTM1238 at a temperature of 190° C. with 10 kg load; and a molecular weight distribution (MWD=Mw/Mn) of 2.5 to 3.6 when measured according to gel permeation chromatography. The LLDPE comprises a short chain branching distribution defined by a copolymer fraction greater than 85%, the copolymer fraction being defined as a ratio of the mass eluted at temperatures from greater than 35° C. to less than 95° C. to the total mass eluted when measured using an improved comonomer content distribution (iCCD) curve of mass eluted versus temperature; a high density fraction from 0.5 to 8.0%, the high density fraction being defined as a ratio of the mass eluted at temperatures at or above 95° C. to the total mass; and a soluble fraction from 1.0% and 12.0%, the soluble fraction being defined as a ratio of the mass eluted at temperatures at or below 35° C. to the total mass.

According to another embodiment of the present disclosure, a linear low density polyethylene (LLDPE) polymer is provided. The LLDPE comprises the polymerized reaction product of ethylene monomer, and $C_3$-$C_{12}$ ethylene comonomer. The LLDPE has a density of about 0.910 to 0.920 g/cc; a melt index (I2) of 2.0 to 7.0 g/10 minutes when measured according to ASTM1238 under a load of 2.16 kg at a temperature of 190° C.; and a melt flow ratio (I10/I2) of 6.5 to 7.5, wherein I10 is measured according to ASTM1238 at a temperature of 190° C. with 10 kg load. The LLDPE comprises a short chain branching distribution defined by: a high density fraction from 0.5 to 6.0%, the high density fraction being defined as a ratio of the mass eluted within the temperature range at or above 95° C. to the total mass eluted when measured using an iCCD curve of mass eluted versus temperature; a soluble fraction from 1.0% and 3.0%, the soluble fraction being defined as a ratio of the mass eluted within the temperature range at or below 35° C. to the total mass eluted; a ratio of the soluble fraction to the high density fraction is from 0.40 to 0.65; and a maximum elution peak height occurs at a temperature of above 80° C. In a further embodiment, the LLDPE may be included in a cast film.

DETAILED DESCRIPTION

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

Definitions

The term "polymer" refers to a polymeric compound prepared by polymerizing monomers, whether of the same or a different type. The generic term polymer thus embraces the terms "homopolymer" and "copolymer" or "interpolymer." Homopolymer is usually employed to refer to polymers prepared from only one type of monomer. Copolymer and interpolymer are usually employed to refer to polymers prepared from two or more different monomers. The generic terms copolymer and interpolymer thus include polymers prepared from more than two different types of monomers, such as terpolymers.

"Polyethylene" or "ethylene-based polymer" shall mean polymers comprising greater than 50% by mole of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. Nos. 8,916,667, 8,871,887, 8,822,601, 9,228,036, and 9,765,160, which are hereby incorporated by reference). LDPE resins typically have a density in the range of 0.915 to 0.935 g/cm$^3$.

The term "LLDPE" includes resin made using Ziegler-Natta catalyst systems as well as resin made using single-site catalysts, including, but not limited to, bis-metallocene catalysts (sometimes referred to as "m-LLDPE" or metallocene-LLDPE) and constrained geometry catalysts, and resin made using post-metallocene, molecular catalysts. LLDPE includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,773,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342). The LLDPE resins can be made via gas-phase, solution-phase or slurry polymerization or any combination thereof, using any type of reactor or reactor configuration known in the art.

The term "MDPE" refers to polyethylenes having densities from 0.926 to 0.945 g/cc. "MDPE" is typically made using chromium or Ziegler-Natta catalysts or using single-site catalysts including, but not limited to, bis-metallocene catalysts and constrained geometry catalysts.

The term "HDPE" refers to polyethylenes having densities greater than about 0.945 g/cc, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 to 0.909 g/cc, which are generally prepared with Ziegler-Natta catalysts, single-site catalysts including, but not limited to, bis-metallocene catalysts and constrained geometry catalysts, and post-metallocene, molecular catalysts. The term "propylene-based polymer," as used herein, refers to a polymer that comprises, in polymerized form, greater than 50% by weight of units which have been derived from propylene monomer. This includes propylene homopolymer, random copolymer polypropylene, impact copolymer polypropylene, propylene/alpha-olefin interpolymer, and propylene/alpha-olefin copolymer. These polypropylene materials are generally known in the art.

"Multilayer film" means any structure having more than one layer. For example, the multilayer structure may have two, three, four, five or more layers. A multilayer film may be described as having the layers designated with letters. For example, a three layer structure having a core layer B, and two external layers A and C may be designated as A/B/C. Likewise, a structure having two core layers B and C and two external layers A and D would be designated A/B/C/D. Additionally, the skilled person would know that further layers E, F, G, etc. may also be incorporated into this structure.

Catalyst Description

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "co-catalyst" and "activator" are interchangeable terms.

When used to describe certain carbon atom-containing chemical groups, a parenthetical expression having the form "$(C_x\text{-}C_y)$" means that the unsubstituted form of the chemical group has from x carbon atoms to y carbon atoms, inclusive of x and y. For example, a $(C_1\text{-}C_{50})$alkyl is an alkyl group having from 1 to 50 carbon atoms in its unsubstituted form. In some embodiments and general structures, certain chemical groups may be substituted by one or more substituents such as $R^S$.

The term "$(C_1\text{-}C_{50})$hydrocarbyl" means a hydrocarbon radical of from 1 to 50 carbon atoms, in which each hydrocarbon radical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a $(C_1\text{-}C_{50})$hydrocarbyl may be an unsubstituted or substituted $(C_1\text{-}C_{50})$alkyl, $(C_3\text{-}C_{50})$cycloalkyl, $(C_3\text{-}C_{20})$cycloalkyl-$(C_1\text{-}C_{20})$alkylene, $(C_6\text{-}C_{40})$aryl, or $(C_6\text{-}C_{20})$aryl-$(C_1\text{-}C_{20})$alkylene (such as benzyl (—CH$_2$—C$_6$H$_5$)).

The terms "$(C_1\text{-}C_{50})$alkyl" and "$(C_1\text{-}C_{18})$alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted $(C_1\text{-}C_{50})$alkyl are unsubstituted $(C_1\text{-}C_{20})$alkyl; unsubstituted $(C_1\text{-}C_{10})$alkyl; unsubstituted $(C_1\text{-}C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1\text{-}C_{40})$alkyl are substituted $(C_1\text{-}C_{20})$alkyl, substituted $(C_1\text{-}C_{10})$alkyl, trifluoromethyl, and [C$_{45}$]alkyl. The term "[C$_{45}$]alkyl" means there is a maximum of 45 carbon atoms in the radical, including substituents, and is, for example, a $(C_{27}\text{-}C_{40})$alkyl substituted by one $R^S$, which is a $(C_1\text{-}C_5)$alkyl, respectively. Each $(C_1\text{-}C_5)$alkyl may be methyl, trifluoromethyl, ethyl, 1-propyl, 1-methylethyl, or 1,1-dimethylethyl.

The term "$(C_6\text{-}C_{50})$aryl" means an unsubstituted or substituted (by one or more $R^S$) monocyclic, bicyclic, or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted $(C_6-C_{50})$aryl include: unsubstituted $(C_6-C_{20})$aryl, unsubstituted $(C_6-C_{18})$aryl; 2-$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl include: substituted $(C_1-C_{20})$aryl; substituted $(C_6-C_{18})$aryl; 2,4-bis([$C_{20}$]alkyl)-phenyl; polyfluorophenyl; pentafluorophenyl; and fluoren-9-one-1-yl.

The term "$(C_3-C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

The term "halogen atom" or "halogen" means the radical of a fluorine atom (F), chlorine atom (Cl), bromine atom (Br), or iodine atom (I). The term "halide" means the anionic form of the halogen atom: fluoride (F−), chloride (Cl−), bromide (Br−), or iodide (I−).

Ziegler-Natta catalysts typically comprise a procatalyst and a cocatalyst. Key components in a Ziegler-Natta procatalyst include a titanium species, a magnesium chloride ($MgCl_2$) support, and optionally an electron donor. In some embodiments, a titanium precursor and a magnesium precursor are chlorinated and converted into a Ziegler-Natta procatalyst using a chlorinating agent, optionally in the presence of an electron donor. In some embodiments, a magnesium chloride support is premade from a magnesium precursor, followed by introduction of a titanium species, which may undergo chlorination using a chlorinating agent. In some specific embodiments, the chlorination of the titanium species proceeds in the absence of an electron donor. In some specific embodiments, the chlorination of the titanium species proceed in the presence of an electron donor. The magnesium chloride support may be prepared via chlorination of a magnesium compound. In some embodiments, the magnesium chloride support is made by chlorination of a solution of a hydrocarbon-soluble magnesium precursor to afford a $MgCl_2$ slurry in the same hydrocarbon solvent used for making the magnesium precursor solution. In some embodiments, a magnesium chloride support is prepared before introducing other procatalyst components, such magnesium chloride support is also called preformed magnesium chloride support, for example, a preformed $MgCl_2$ slurry.

In some embodiments, a non-reducing, hydrocarbon-soluble transition metal compound in an oxidation state of +2 or +3 is used together with a titanium compound for making a Ziegler-Natta procatalyst. In some embodiments, the Ziegler-Natta procatalyst is made using a preformed $MgCl_2$ slurry in the same hydrocarbon solvent used for making the magnesium precursor solution. In some embodiments, the non-reducing transition metal compound is soluble in the hydrocarbon solvent of the $MgCl_2$ slurry. Not intending to be bound by any theory, it is believed that being soluble in the hydrocarbon solvent of the $MgCl_2$ slurry affords better dispersion of the transition metal compound in the slurry and facilitates interaction between the transition metal compound and $MgCl_2$ surface. In some embodiments, a chlorinating agent is also employed in the synthesis of the Ziegler-Natta procatalyst. In some embodiments, a preformed $MgCl_2$ slurry, a titanium compound, a non-reducing, hydrocarbon-soluble transition metal compound in an oxidation state of +2 or +3, and a chlorinating agent are used for making a Ziegler-Natta procatalyst. The addition of the titanium compound, the transition metal compound, and the chlorinating agent to the $MgCl_2$ slurry can be conducted simultaneously, together, or in any sequence (see following Table 1) (When 2 or 3 materials are listed together, they are premixed and added together, or they are added simultaneously).

TABLE 1

Options for Procatalyst Preparation by Order of Addition of Components

| First Addition | Second Addition | Third Addition |
|---|---|---|
| Chlorinating Agent | Transition Metal Compound | Titanium Compound |
| Chlorinating Agent | Titanium Compound | Transition Metal Compound |
| Transition Metal Compound | Chlorinating Agent | Titanium Compound |
| Transition Metal Compound | Titanium Compound | Chlorinating Agent |
| Titanium Compound | Chlorinating Agent | Transition Metal Compound |
| Titanium Compound | Transition Metal Compound | Chlorinating Agent |
| Chlorinating Agent/ Transition Metal Compound | Titanium Compound | |
| Titanium Compound | Chlorinating Agent/ Transition Metal Compound | |
| Chlorinating Agent/ Titanium Compound | Transition Metal Compound | |
| Transition Metal Compound | Chlorinating Agent/ Titanium Compound | |
| Transition Metal Compound/Titanium Compound | Chlorinating Agent | |
| Chlorinating Agent | Transition Metal Compound/Titanium Compound | |
| Chlorinating Agent/ Transition Metal Compound/Titanium Compound | | |

The inventors surprisingly discovered that the inclusion of the non-reducing, hydrocarbon-soluble transition metal compound in an oxidation state of +2 or +3 in the procatalyst significantly reduces the polymer high density fraction in the resultant polyethylene copolymer. While not wishing to be bound by theory, it is believed that reaction between the transition metal compound and the chlorinating agent converts the transition metal compound into a species that is not hydrocarbon-soluble and deposits onto the $MgCl_2$ surface, thus changing the nature of interaction between the $MgCl_2$ support and the active titanium species and resulting in changes in polymer composition. Further improvements in polymer properties were also unexpectedly obtained from inclusion of a vanadium compound in the procatalyst. The vanadium compound can be introduced to the procatalyst with other procatalyst components simultaneously, together, or in any sequence.

In some embodiments, a chlorinating agent is added to $MgCl_2$ before other components. In some embodiments, less than 10% of the non-reducing, hydrocarbon-soluble transition metal compound remains in the solution phase 30 minutes after being added to the chlorinating agent-treated $MgCl_2$. In another embodiment, less than 5% of the non-reducing, hydrocarbon-soluble transition metal compound remains in the solution phase 75 minutes after being added to the chlorinating agent-treated $MgCl_2$.

The reaction temperatures for adding each procatalyst component to $MgCl_2$ may be the same or different. In some embodiments, the reaction temperature may be chosen from −30° C. to 200° C., or 0° C. to 100° C., or 20° C. to 50° C.

The reaction time for adding each procatalyst component to $MgCl_2$ may be the same or different. In some embodiments, the reaction time may be chosen from 1 minutes to 10 days, or 10 minutes to 24 hours, or 30 minutes to 12 hours.

Embodiments of this disclosure include heterogeneous procatalysts. The heterogeneous procatalysts may contain a titanium species, a hydrocarbon soluble transition metal compound having a structure $M(OR^1)_z$, a chlorinating agent has a structure $A(Cl)_x(R^2)_{3-x}$, and a magnesium chloride component.

In the structure $M(OR^1)_z$ of the transition metal compound, M is a transition metal having an oxidation state of +2 or +3. The transition metal, M, may be non-reducing and may not include Ti. The term "transition metal" refers to elements in Groups 3-12 according to the IUPAC nomenclature, and does not include lanthanides or actinide elements. In one or more embodiments, the transition metal, M, is chosen from the first row transition metal (also called Period 4 transition metals). In some embodiments, M is chosen from zinc, copper, cobalt, manganese, iron, or chromium.

In the hydrocarbon soluble transition metal compound, each $R^1$ of $M(OR^1)_z$ may independently be chosen from $(C_1-C_{30})$hydrocarbyl or $—C(O)R^{11}$, where $R^{11}$ is $(C_1-C_{30})$hydrocarbyl. Subscript z of $M(OR^1)_z$ is 2 or 3. The transition metal compound is soluble in a hydrocarbon solvent. In one or more embodiments, each $R^1$ and $R^{11}$ may be optionally substituted with one or more than one halogen atoms, or one or more than one $—Si(R^S)_3$, where each $R^S$ is $(C_1-C_{30})$hydrocarbyl. In some embodiments, $R^1$ and $R^{11}$ may be chosen from methyl, ethyl, propyl, 2-propyl, n-butyl, tert-butyl, iso-butyl, n-pentyl, n-hexyl, n-heptyl, n-octyl, 2-ethylhexyl, tert-octyl, n-nonyl, or n-decyl. In some embodiments, when $R^1$ is $—C(O)R^{11}$, $R^{11}$ may be chosen from 3-heptyl and 2-methyloctan-2-yl. In one or more embodiments, the hydrocarbon soluble transition metal compound may be a metal salt of naphthenic acids. Naphthenic acids are mixtures of cycloaliphtic carboxylic acids and may be represented by the formula $C_nH_{2(n-z)}O_2$, where n is 5 to 30; and z is 0 to 4. In a non-limiting example, when the hydrocarbon soluble transition metal compound is a metal salt of naphthenic acid, $R^1$ is $—C(O)R^{11}$ and $R^{11}$ may be (3-ethyl)-2-cyclopentyl-2-ethyl. The naphthenic acids may be isolated from crude oil.

In some embodiments, when $R^1$ or $R^{11}$ of the transition metal compound is substituted with one or more groups $—Si(R^S)_3$, $R^S$ may be chosen from methyl, ethyl, n-propyl, 2-propyl, n-butyl, tert-butyl, iso-butyl, n-pentyl, n-hexyl, n-heptyl, n-octyl, 2-ethylhexyl, tert-octyl, n-nonyl, or n-decyl. In some embodiments, when $R^1$ is $—C(O)R^{11}$, $R^{11}$ maybe chosen from 3-heptyl and 2-methyloctan-2-yl.

In some embodiments, the transition metal compound is a metal alkoxide or carboxylate with melting point equal to or less than 50° C., preferably equal to or lower than 35° C., most preferably equal to or lower than 25° C. In some embodiments, the transition metal compound $M(OR^1)_z$ or $M(OC(O)R^{11})_z$ contains a $(C_1-C_{10})$hydrocarbyl substitution at the 2-position of the $R^1$ or $R^{11}$ group. In one or more embodiments, M is chosen from zinc, cobalt, copper, manganese, iron, or chromium. In some embodiments, the transition metal compound is chosen from zinc(II) 2-ethylhexanoate, zinc(II) neodecanoate, zinc(II) naphthenate, cobalt(II) 2-ethylhexanoate, cobalt(II) neodecanoate, cobalt (II) naphthenate, copper(II) 2-ethylhexanoate, copper(II) neodecanoate, copper(II) naphthenate, manganese(II) 2-ethylhexanoate, manganese(II) neodecanoate, manganese(II) naphthenate, iron(III) 2-ethylhexanoate, iron(III) neodecanoate, iron(II) naphthenate, iron(III) ethoxide, chromium (III) 2-ethylhexanoate, chromium(III) neodecanoate, or chromium(III) naphthenate.

In the structure $A(Cl)_x(R^2)_{3-x}$ of the chlorinating agent, A is aluminum or boron; $R^2$ is $(C_1-C_{30})$hydrocarbyl; and subscript x is 1, 2, or 3. In one or more embodiments, subscript x is 2; and $R^2$ is chosen from chosen from methyl, ethyl, n-propyl, 2-propyl, n-butyl, tert-butyl, iso-butyl, n-pentyl, n-hexyl, n-heptyl, n-octyl, tert-octyl, n-nonyl, or n-decyl. In some embodiments, subscript x is 3.

In some embodiments, the chlorinating agent may be chosen from aluminum trichloride, methylaluminum dichloride, dimethylaluminum chloride, ethylaluminum dichloride, diethylaluminum chloride, ethylaluminum sesquichloride, isobutylaluminum dichloride, diisobutylaluminum chloride, n-hexylaluminum dichloride, di-n-hexylaluminum chloride, n-octylaluminum dichloride, di-n-octylalumnium chloride, boron trichloride, phenylboron dichloride, dicyclohexylboron chloride, silicon tetrachloride, methyltrichlorosilane, dimethyldichlorosilane, chlorotrimethylsilane, ethyltrichlorosilane, dichlorodiethylsilane, chlorotriethylsilane, n-propyltrichlorosilane, dichlorodi(n-propyl)silane, chlorotri(n-propyl)silane, isopropyltrichlorosilane, dichlorodiisopropylsilane, chlorotriisopropylsilane, n-butyltrichlorosilane, dichlorodi(n-butyl)silane, chlorotri(n-butyl)silane, isobutyltrichlorosilane, dichlorodiisobutylsilane, chlorotriisobutylsilane, cyclopentyltrichlorosilane, dichlorodicyclopentylsilane, n-hexyltrichlorosilane, cyclohexyltrichlorosilane, dichlorodicyclohexylsilane, and combinations thereof.

In one or more embodiments, the heterogeneous procatalyst further contains a vanadium component. The vanadium component may be chosen from $VX_4$, $VOX_3$, or $VO(OR^3)_3$, where each X is independently a halogen atom or $(C_1-C_{40})$ heterohydrocarbyl; and $R^3$ is $(C_1-C_{20})$hydrocarbyl or $—C(O)R^{31}$, where $R^{31}$ is $(C_1-C_{30})$hydrocarbyl. In one or more embodiments, $R^3$ and $R^{31}$ may be chosen from methyl, ethyl, n-propyl, 2-propyl, n-butyl, tert-butyl, iso-butyl, n-pentyl, n-hexyl, n-heptyl, n-octyl, tert-octyl, n-nonyl, or n-decyl. In some embodiments, when $R^1$ is $—C(O)R^{31}$, $R^{31}$ is 3-heptyl.

In some embodiments, the vanadium component is chosen from vanadium(IV) chloride, vanadium(V) oxytrichloride, vanadium(V) oxytrimethoxide, vanadium(V) oxytriethoxide, vanadium(V) oxytripropoxide, vanadium(V) oxytriisopropoxide, vanadium(V) oxytributoxide, vanadium (V) oxytriisobutoxide vanadyl acetate, vanadium(IV) oxide stearate, vanadium octanoate, and combinations thereof.

In embodiments, processes for polymerizing ethylene-based polymers include contacting ethylene and optionally one or more α-olefins in the presence of a catalyst system, in which the catalyst system comprises one heterogeneous procatalyst or more than one heterogeneous procatalyst.

In embodiments, processes for producing heterogeneous procatalysts include forming magnesium chloride ($MgCl_2$) in a hydrocarbon solvent as a $MgCl_2$ slurry. Then, mixing a chlorinating agent, a transition metal compound, and titanium species into the $MgCl_2$ slurry, in which the transition metal compound has a structure $M(OR^1)_z$ and the chlorinating agent has a structure $A(Cl)_x(R^2)_{3-x}$.

In one or more embodiments of the heterogeneous catalyst, the magnesium chloride component has a surface area of greater than or equal to 100 $m^2/g$ as measured according to the BET method. In some embodiments, the magnesium chloride component has a surface area of greater than or equal to 150 $m^2/g$, or greater than or equal to 200 $m^2/g$. In other embodiments, the magnesium chloride component has a surface area of from 100 $m^2/g$ to 800 $m^2/g$, or 200 $m^2/g$ to 600 $m^2/g$, or from 300 $m^2/g$ to 500 $m^2/g$.

In one or more embodiments, the magnesium chloride includes a high surface area which can be obtained from chlorination of magnesium compounds. Such magnesium compounds include organomagnesium, organomagnesium halide, magnesium alkoxide, carbonated magnesium alkoxide, magnesium carboxylate, and combinations thereof. In embodiments, magnesium chloride may be obtained from conversion of magnesium chloride adducts. Suitable magnesium chloride adducts include magnesium chloride adducts with alcohols and magnesium chloride adducts with ethers. In some embodiments, the magnesium chloride adducts are magnesium chloride adducts with ethanol. In some embodiments, the magnesium chloride adducts are magnesium chloride adducts with tetrahydrofuran.

In one or more embodiments, the magnesium chloride components include, for example, the reaction product of a chloride source with a hydrocarbon soluble hydrocarbylmagnesium compound or mixture of compounds. Exemplary organomagnesium compounds include di($C_1$-$C_{20}$)alkylmagnesium or di($C_1$-$C_{20}$)arylmagnesium compounds, particularly di(n-butyl)magnesium, di(sec-butyl)magnesium, diisopropylmagnesium, di-n-hexylmagnesium, isopropyl-n-butyl-magnesium, ethyl-n-hexylmagnesium, ethyl-n-butylmagnesium, di-n-octylmagnesium, and combinations thereof. Exemplary suitable magnesium diaryls include diphenylmagnesium, dibenzylmagnesium and ditolylmagnesium. The organomagnesium compounds may optionally be treated with an organoaluminum compound for improving solubility, reducing solution viscosity, or both improving solubility and reducing solution viscosity. Stabilizers, including those derived from substituted phenol compounds, may also be present. Additional suitable organomagnesium compounds include alkyl- and aryl-magnesium alkoxides, aryloxides and chlorides, as well as mixtures of the foregoing. Highly preferred organomagnesium compounds are the halogen-free organomagnesium compounds.

Among the chloride sources which can be employed in the preparation of the magnesium chloride component for use herein include metallic chlorides and nonmetallic chlorides, including organochlorides and hydrogen chloride. Suitable metallic chlorides, which can be employed herein, include a formula according to: $MR_{y-a}Cl_a$, wherein: M is a metal of Groups 13, 14 or 15 of the Periodic Table of Elements; R is a monovalent organic radical; y has a value corresponding to the valence of M, and a has a value from 1 to y.

In one or more embodiments, metallic chlorides may be chosen from alkylaluminum chlorides having the formula: $AlR_{3-a}Cl_a$, wherein: each R is independently ($C_1$-$C_{10}$)hydrocarbyl, preferably ($C_1$-$C_6$)alkyl, and a is a number from 1 to 3. The alkylaluminum chlorides may include, and are not limited to: ethylaluminum sesquichloride, diethylaluminum chloride, and ethylaluminum dichloride, with ethylaluminum dichloride being especially preferred. Alternatively, a metal chloride such as aluminum trichloride or a combination of aluminum trichloride with an alkyl aluminum chloride or a trialkyl aluminum compound may be suitably employed.

Suitable nonmetallic chlorides and organochlorides are represented by the formula $R'Cl_r$, wherein R' is hydrogen, ($C_1$-$C_{10}$)hydrocarbyl, or a non-metal such as Si, P, Ga or Ge; and subscript r is an integer from 1 to 6. Particularly suitable chloride sources include, for example, hydrogen chloride and active organochlorides such as t-alkyl chlorides, sec-alkyl chlorides, allyl chlorides, and benzyl chlorides and other active hydrocarbyl chlorides wherein hydrocarbyl is as defined herein before. By an active organic chloride is meant a hydrocarbyl chloride that contains a labile chloride at least as active, that is, as easily lost to another compound, as the chloride of sec-butyl chloride, preferably as active as t-butyl chloride. In addition to the organic monochlorides, it is understood that organic dichlorides, trichlorides and other polychlorides that are active as defined herein before are also suitably employed. Examples of preferred chloride sources include hydrogen chloride, t-butyl chloride, t-amyl chloride, allyl chloride, benzyl chloride, crotyl chloride, and diphenylmethyl chloride. Most preferred are hydrogen chloride, t-butyl chloride, allyl chloride and benzyl chloride.

In some embodiments, the chloride compound may be hydrochloride gas. In embodiments, the organomagnesium compound and the chloride compound may be contacted at a temperature of from −25° C. to 100° C., or from 0° C. to 50° C. In some embodiments, heat removal is needed in order to control set reaction temperature within ±5° C., such as within ±3° C. In some embodiments, the amount of chloride source is controlled in order to achieve a target molar ratio of Cl to Mg in the resulting $MgCl_2$. For example, the molar ratio of Cl to Mg can be from 1.8 to 2.0 for a chloride-deficient $MgCl_2$ support, or from 2.0 to 2.2 for a chloride-rich $MgCl_2$ support. In some embodiments, the slurry of organomagnesium compound and metallic or nonmetallic chloride may be contacted for a time of from 1 hour to 12 hours, or from 4 hours to 6 hours. The concentration of the organomagnesium compound in the slurry (i.e., before the chloride compound is added to the slurry) may be sufficient so that when the chloride compound is added to the slurry, the resultant composition may include a concentration of magnesium of from 0.005 moles per liter (mol/L) to 1.000 mol/L.

In some embodiments, the $MgCl_2$ slurry is prepared before being treated with other procatalyst component and is referred to herein as a "preformed $MgCl_2$ slurry." In some embodiments, the $MgCl_2$ slurry may have a concentration of $MgCl_2$ of from 0.005 mol/L to 10.00 mol/L, or from 0.05 mol/L to 1.00 mol/L.

The magnesium chloride support can be preformed from the organomagnesium compound and the chloride source and stored for later use or it can be preformed in situ in which instance the procatalyst is preferably prepared by mixing in a suitable solvent or reaction medium (1) the organomagnesium component and (2) the chloride source, followed by the other procatalyst components.

In one or more embodiments, the titanium species may be a titanium species having catalytic activity. In some embodiments, titanium species are $TiCl_{4-c}(OR)_c$ or $TiCl_{3-d}(OR)_d$, wherein R is ($C_1$-$C_{20}$)hydrocarbyl, c is 0, 1, 2, 3, or 4, and d is 0, 1, 2, or 3. For example, in some embodiments, the titanium species may include, but is not limited to, titanium (IV) tetrachloride, titanium(III) trichloride, tris(2,2,6,6-tetramethyl-3,5-heptanedionato)titanium(III), trichlorotris (tetrahydrofuran) titanium(III), di-n-butoxytitanium(IV) dichloride, diethoxytitanium(IV) dichloride, diisopropoxytitanium(IV) dichloride, diisobutoxytitanium(IV) dichloride, triisopropoxytitanium(IV) chloride, tri-n-butoxytitanium (IV) chloride, triisobutoxytitanium(IV) chloride, titanium (IV) tetraisopropoxide (Ti(O$^i$Pr)$_4$), titanium(IV) ethoxide, titanium(IV) n-butoxide, titanium(IV) isobutoxide, titanium (IV) 2-ethylhexoxide, dichlorobis(2,2,6,6-tetramethyl-3,5-heptanedionato)titanium(IV), tetrachlorobis(tetrahydrofuran) titanium(IV), methyltitanium(IV) trichloride, or combinations thereof. In some embodiments, the titanium species may be titanium(IV) tetrachloride or titanium(IV) tetraisopropoxide (Ti(O$^i$Pr)$_4$). For example, in some embodiments, the titanium species may include a titanium halide, a titanium alkoxide, or combinations thereof. For example, in some embodiments, the titanium species may include, but is not limited to, titanium tetrachloride (TiCl$_4$), titanium(IV) tetraisopropoxide (Ti(O$^i$Pr)$_4$), other titanium halide or titanium alkoxide, or combinations of these.

In embodiments, processes for making the heterogeneous procatalyst include hydrocarbon solvent. The hydrocarbon solvent may be chosen from non-halogenated (C$_3$-C$_{30}$)alkyl or non-halogenated (C$_3$-C$_{30}$)cycloalkyl solvents. In some embodiments, the hydrocarbon solvent may include an isoparaffin solvent. Examples of ispoaraffin solvents may include, but are not limited to, ISOPAR™ synthetic paraffin solvents available from ExxonMobil (e.g., ISOPAR™ E paraffin solvent), and special boiling point (SBP) solvents by Shell Chemicals (e.g., SBP 100/140 high purity de-aromatized hydrocarbon solvent). Other examples of hydrocarbon solvents may include isobutane, pentane, isopentane, cyclopentane, hexane, 2-methylpentane, 3-methylpentane, cyclohexanes, methylcyclopentane, heptane, 2-methylhexane, 3-methylhexane, octane, 2,2,4-trimethylpentane, tetradecane, and combinations thereof.

In one or more embodiments of the heterogeneous catalyst, the ratio of transition metal, M, (in the transition metal compound) to titanium is from 0.1 to 10 (mole/mole). All individual values and subranges encompassed by "from 0.1 to 10 (mole/mole)" are disclosed herein as separate embodiments; for example, the range "from 0.1 to 10 (mole/mole)" includes 0.2 to 5, 0.5 to 3, and 0.3 to 2 as subranges.

In one or more embodiments of the heterogeneous catalyst, the molar ratio of magnesium chloride to titanium is from 1 to 100 (mole of magnesium chloride per mole of titanium metal). All individual values and subranges encompassed by "from 1 to 100" are disclosed herein as separate embodiments; for example, the range "from 1 to 100" includes 8.0 to 80, 15 to 50, and 30 to 70 as subranges.

In one or more embodiments of the heterogeneous catalyst, the molar ratio of vanadium to titanium is from 0.1 to 10 (mole of vanadium metal per mole of titanium metal). All individual values and subranges encompassed by "from 0.1 to 10" are disclosed herein as separate embodiments; for example, the range "from 0.1 to 10 (mole/mole)" includes 0.2 to 5, 0.5 to 3, and 0.3 to 4 as subranges.

In some embodiments, a multi-metallic procatalyst may be utilized as described in U.S. Pat. No. 9,255,160, which is incorporated by reference herein. The multi-metallic procatalyst used in producing the reaction product is at least trimetallic, but may also include more than three transition metals, and thus may in one embodiment be defined more comprehensively as multi-metallic. These three, or more, transition metals are selected prior to production of the catalyst. In a particular embodiment, the multi-metal catalyst comprises titanium as one element.

Cocatalyst Component

The heterogeneous procatalyst according to this disclosure may be combined with a cocatalyst to form a Zeigler-Natta catalyst. The Zeigler-Natta catalyst comprising the heterogeneous procatalyst may be rendered catalytically active by any technique known in the art for activating Zeigler-Natta type procatalysts of olefin polymerization reactions. For example, the heterogeneous procatalyst may be rendered catalytically active by contacting the procatalyst to, or combining the procatalyst with, an activating cocatalyst. Suitable activating cocatalysts for use herein include alkyl aluminums, including polymeric or oligomeric alumoxanes (also known as aluminoxanes). Combinations of one or more of the foregoing activating cocatalysts are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane. In some embodiments, the cocatalyst may be chosen from an alkyl of aluminum, a haloalkyl of aluminum, an alkylaluminum halide, and mixtures thereof. In some embodiments, the cocatalyst may be chosen from triethylaluminum, trimethylaluminum, tri-n-butylaluminum, triisobutylaluminum, tri-n-hexylaluminum, tri-n-octylaluminum, diethylaluminum chloride, MAO, MMAO, diethylaluminum ethoxide, and mixtures thereof.

Ethylene Based Polymer

The catalytic systems described in this disclosure may be utilized in the polymerization of olefins, primarily ethylene based polymers. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or in the alternative, from the group consisting of 1-hexene and 1-octene.

The ethylene-based polymers, for example homopolymers and/or interpolymers (including copolymers) of ethylene and optionally one or more co-monomers such as α-olefins, may comprise from at least 50 mole percent (mol %) monomer units derived from ethylene. All individual values and subranges encompassed by "from at least 50 mole percent" are disclosed herein as separate embodiments; for example, the ethylene based polymers, homopolymers and/or interpolymers (including copolymers) of ethylene and optionally one or more co-monomers such as α-olefins may comprise at least 60 mole percent monomer units derived from ethylene; at least 70 mole percent monomer units derived from ethylene; at least 80 mole percent monomer units derived from ethylene; or from 50 to 100 mole percent monomer units derived from ethylene; or from 80 to 100 mole percent monomer units derived from ethylene.

In some embodiments, the catalyst systems may produce ethylene-based polymers that include at least 90 mole percent units derived from ethylene. All individual values and subranges from at least 90 mole percent are included herein and disclosed herein as separate embodiments. For example, the ethylene-based polymers may comprise at least 93 mole percent units derived from ethylene; at least 96 mole percent units; at least 97 mole percent units derived from ethylene; or in the alternative, from 90 to 100 mole percent units derived from ethylene; from 90 to 99.5 mole percent units derived from ethylene; or from 97 to 99.5 mole percent units derived from ethylene.

In some embodiments, the catalyst system produces ethylene-based polymers having an amount of additional α-olefin that is less than 50 mole percent (mol %); in other embodiments the amount of additional α-olefin includes at least 0.01 mol % to 25 mol %; and in further embodiments the amount of additional α-olefin includes at least 0.1 mol % to 10 mol %. In some embodiments, the additional α-olefin is 1-octene or 1-hexene.

Any conventional polymerization processes may be employed to produce the ethylene-based polymers in the presence of the catalyst system comprising a heterogeneous procatalyst of this disclosure. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example. In one embodiment, the ethylene-based polymer may be produced via solution polymerization in a dual reactor system, for example a dual loop reactor system, wherein ethylene and, optionally, one or more α-olefins are polymerized in the presence of the catalyst system, as described herein, and optionally one or more cocatalysts. The catalyst system, as described herein, can be used in the first reactor, or second reactor, optionally in combination with one or more other catalysts. In one embodiment, the ethylene-based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the ethylene-based polymer may be produced via solution polymerization in a single reactor system, for example a single loop reactor system or a single stirred tank reactor system, in which ethylene and optionally one or more α-olefins are polymerized in the presence of the catalyst system, as described within this disclosure, optionally one or more cocatalysts, as described in the preceding paragraphs and optionally in combination with one or more other catalysts.

In embodiments described herein, the ethylene-based polymer may have a metal catalyst residual of greater than or equal to 1 parts by combined weight of at least three metal residues per one million parts of polyethylene polymer, wherein the at least three metal residues are selected from the group consisting of zinc, titanium, zirconium, hafnium, vanadium, niobium, tantalum, chromium, molybdenum, tungsten, and combinations thereof, and wherein each of the at least three metal residues is present at greater than or equal to 0.2 ppm, for example, in the range of from 0.2 to 5 ppm. All individual values and subranges from greater than or equal to 0.2 ppm are included herein and disclosed herein; for example, the ethylene-based polymer may further comprise greater than or equal to 2 parts by combined weight of at least three metal residues remaining from the multi-metallic polymerization catalyst per one million parts of the polyethylene composition. In some embodiments, the ethylene-based polymer comprises at least 0.75 ppm of V (Vanadium). All individual values and subranges from at least 0.75 ppm of V are included and disclosed herein; for example the lower limit of the V in the ethylene-based polymer may be 0.75, 1, 1.1, 1.2, 1.3 or 1.4 ppm to an upper limit of the V in the ethylene-based polymer may be 5, 4, 3, 2, 1.9, 1.8, 1.7, 1.6, 1.5, or 1 ppm.

The ethylene-based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene-based polymers may contain any amounts of additives. The ethylene-based polymers may comprise from about 0 to about 10 percent by the combined weight of such additives, based on the weight of the ethylene-based polymers and the one or more additives. The ethylene-based polymers may further comprise fillers, which may include, but are not limited to, organic or inorganic fillers. The ethylene-based polymers may contain from about 0 to about 20 weight percent fillers such as, for example, calcium carbonate, talc, or $Mg(OH)_2$, based on the combined weight of the ethylene-based polymers and all additives or fillers. The ethylene-based polymers may further be blended with one or more polymers to form a blend. In one or more embodiments, the additives, fillers, one or more polymers, or combinations may increase or decrease the density of the overall ethylene-based polymer.

The ethylene-based polymers may have a density according to ASTM D792 (incorporated herein by reference in its entirety) from 0.850 g/cc to 0.970 g/cc. Moreover, the ethylene-based polymer may comprise LLDPE having a density of 0.904 to 0.925 g/cc, from 0.904 to 0.920 g/cc, from 0.910 to 0.920 g/cc, from 0.916 to 0.920, from 0.915 to 0.925, from 0.917 to 0.923, or from 0.912 to 0.918 g/cc. Moreover, the ethylene-based polymer may comprise LLDPE having a density of 0.930 to 0.970 g/cc, from 0.931 to 0.965 g/cc, from 0.932 to 0.950, from 0.930 to 0.940, from 0.950 to 0.970, or from 0.933 to 0.940 g/cc. Moreover, the ethylene-based polymer may comprise LLDPE having a density of 0.915 to 0.930 g/cc, from 0.916 to 0.929 g/cc, from 0.917 to 0.928, or from 0.918 to 0.927 g/cc.

In another embodiment, the ethylene-based polymers (e.g., LLDPE) have a melt index, $I_2$ of 0.1 to 7.0 when measured according to ASTM D1238 (incorporated herein by reference in its entirety) at 190° C. and 2.16 kg load (Procedure D). For blown film applications, the ethylene based polymer may be a LLDPE having a melt index ($I_2$) of 0.5 to 2.5 g/10 mins, or from 0.5 to 2.0 g/10 mins, or 1 g/10 mins or less. For cast film applications, the ethylene based polymer may be a LLDPE having a melt index ($I_2$) of 2.0 to 7.0 g/10 mins, or from 2.0 to 4.0 g/10 mins, or from 2.5 to 3.5 g/10 mins.

Moreover, the ethylene-based polymer may be a LLDPE having a melt flow ratio ($I_{10}/I_2$) from 5 to 9, or from 5 to 7.7 or from 6.5 to 7.7, or from 6.5 to 7.6, or from 6.5 to 7.5, wherein the $I_{10}$ is measured according to ASTM D1238 at 190° C. and 10 kg load (Procedure D).

In other embodiments, the LLDPE may have a molecular-weight distribution (MWD) from 2.5 to 3.6 as measured by conventional gel permeation chromatography (GPC), where MWD is defined as $M_w/M_n$, with $M_w$ being a weight-average molecular weight and $M_n$ being a number-average molecular weight. In a further embodiment, the LLDPE has a MWD from 2.8 to 3.8. In a further embodiment, the LLDPE has a MWD from 3.0 to 3.6. In a further embodiment, the LLDPE has a MWD from 3.1 to 3.5. In a further embodiment, the LLDPE has a MWD from 3.2 to 3.4.

Moreover, the LLDPE comprises a short chain branching distribution defined by an improved comonomer content distribution (iCCD) curve. In one embodiment, the LLDPE may have a high density fraction determined by iCCD from 0.5 to 8.0%, wherein the high density fraction is defined as a ratio of the mass eluted at temperatures at 95° C. and above to the total mass eluted. In some cases, the temperature range may be from 95 to 115° C. In further embodiments, the LLDPE may have a high density fraction from 0.5 to 8.0%, from 0.5 to 7.5%, or from 3.0% to 8.0%.

Additionally, the LLDPE may comprise a soluble or purge fraction determined by iCCD from 0.5% and 12.0%, wherein the soluble fraction is defined as a ratio of the mass eluted at temperatures 35° C. and below to the total mass eluted. In some cases, the temperature range may be from 23 to 35° C. In further embodiments, the soluble fraction is less than 5%. Moreover, the soluble fraction is from 0.5% to 5.0%, from 0.5% to 4.0%, from 0.5% to 3.0%, from 0.5% to 2.0%, from 0.5% to 1.0%, from 1.0% to 5.0%, from 1.0% to 4.0%, from 1.0% to 3.0%, from 1.0% to 2.0%, from 2.0% to 5.0%, from 2.0% to 4.0%, from 2.0% to 3.0%, from 3.0% to 5.0%, from 3.0% to 4.0%, from 4.0% to 5.0%.

Furthermore, the LLDPE may have a copolymer fraction greater than 85%, wherein the copolymer fraction is defined by a ratio of the mass eluted at temperatures greater than 35° C. to less than 95° C. to the total mass eluted when measured using an iCCD curve of mass eluted versus temperature. In a further embodiment, the copolymer fraction is greater than 90%. In a further embodiment, the copolymer fraction is greater than 85% and less than 92%. In further embodiments, the ratio of the soluble fraction to the high density fraction is from 0.4 to 0.65. Without being limited by theory, the improved properties discussed below are due in part to this larger copolymer fraction and smaller soluble and high density fractions.

Moreover, the maximum elution peak height of the LLDPE may occur at a temperature of above 80° C. In another embodiment, the maximum elution peak height of the LLDPE may occur at a temperature below 90° C. Said another way, the maximum elution peak height of the LLDPE may occur at a temperature between 80 to 95° C., or from 80 to 90° C.

Blown Films

The above described ethylene based polymers (e.g., LLDPE) may be incorporated in a blown film. Various thicknesses are contemplated for the blown film. In one embodiment, the blown film may have a thickness of from 0.3 mils to 10.0 mils, from 0.3 mils to 9.0 mils, from 0.3 mils to 8.0 mils, from 0.3 mils to 7.0 mils, from 0.3 mils to 6.0 mils, from 0.3 mils to 5.0 mils, from 0.3 mils to 4.0 mils, from 0.3 mils to 3.0 mils, from 0.3 mils to 2.0 mils, from 0.3 mils to 1.0 mil, from 1.0 mil to 10.0 mils, from 1.0 mil to 9.0 mils, from 1.0 mil to 8.0 mils, from 1.0 mil to 7.0 mils, from 1.0 mil to 6.0 mils, from 1.0 mil to 5.0 mils, from 1.0 mil to 4.0 mils, from 1.0 mil to 3.0 mils, from 1.0 mil to 2.0 mils, or any combination of these ranges.

Without being bound by theory, the above described LLDPE provides an improved balance of optics (e.g., haze) and abuse resistance (e.g., dart) due to the short chain branching distribution as defined by the iCCD parameters detailed above i.e., soluble fraction, copolymer fraction, and high density fraction.

In one embodiment, the blown film may have a total haze (%) between 4.5% and 10.5% at a thickness of 2.0 mil, between 5.4% and 10.2% at a thickness of 2.0 mil, or a total haze between 7.0% and 10.0% at a thickness of 2.0 mil. Furthermore, the blown film may have a dart value of at least 900 g when at a thickness of 2.0 mil and a resin density below 0.918 g/cc, and/or a dart value of at least 600 g at a thickness of 2.0 mil and a resin density below 0.920 g/cc with a melt index of less than 1.1 g/10 minutes.

Various film configurations are contemplated for the blown films. For example, the blown film may be a multilayer film or a monolayer film. In embodiments, the number of layers in the blown film can depend on a number of factors including, for example, the desired properties of the film, the desired thickness of the film, the content of the other layers of the film, the end use application of the film, the equipment available to manufacture the film, and others. A multilayer blown film can comprise up to 2, 3, 4, 5, 6, 7, 8, 9, 10, or 11 layers in various embodiments.

The above described ethylene based polymers, in some embodiments, can be used in one or more layers of the film. In a monolayer film, the layer may include, in various embodiments, a polymer selected from the following and blends with components selected from the following: the above described ethylene based polymers, a LLDPE, a VLDPE (a very low density polyethylene), a MDPE, a LDPE, a HDPE, a HMWHDPE (a high molecular weight HDPE), a propylene-based polymer, a polyolefin plastomer (POP), a polyolefin elastomer (POE), an olefin block copolymer (OBC), an ethylene vinyl acetate, an ethylene acrylic acid, an ethylene methacrylic acid, an ethylene methyl acrylate, an ethylene ethyl acrylate, an ethylene butyl acrylate, an isobutylene, a maleic anhydride-grafted polyolefin, an ionomer of any of the foregoing, or a combination thereof. In a multilayer film, each layer may include, in various embodiments, a polymer selected from the following and blends with components selected from the following: the above described ethylene based polymers, a LLDPE, a VLDPE (a very low density polyethylene), a MDPE, a LDPE, a HDPE, a HMWHDPE (a high molecular weight HDPE), a propylene-based polymer, a polyolefin plastomer (POP), a polyolefin elastomer (POE), an olefin block copolymer (OBC), an ethylene vinyl acetate, an ethylene acrylic acid, an ethylene methacrylic acid, an ethylene methyl acrylate, an ethylene ethyl acrylate, an ethylene butyl acrylate, an isobutylene, a maleic anhydride-grafted polyolefin, an ionomer of any of the foregoing, or a combination thereof. In some embodiments, a multilayer film of the present disclosure can comprise one or more tie layers known to those of skill in the art.

In one embodiment, the LLDPE is blended with LDPE. In one or more embodiments, the blown film, which may be a monolayer or multilayer film, may comprise a blend having 50 to 95 wt % of the LLDPE, or 60 to 90 wt % of the LLDPE, or 70 to 85 wt % of the LLDPE. Conversely, the blend may comprise 5 to 50 wt % of the LDPE, or 10 to 40 wt % LDPE, or from 15 to 30 wt % LDPE.

Cast Films

The above described ethylene based polymers (e.g., LLDPE) may also be incorporated in a cast film. Various thicknesses are contemplated for the cast film. In one embodiment, the cast film may have a thickness of from 0.3 mils to 10.0 mils, from 0.3 mils to 9.0 mils, from 0.3 mils to 8.0 mils, from 0.3 mils to 7.0 mils, from 0.3 mils to 6.0, from 0.3 mils to 5.0 mils, from 0.3 mils to 4.0 mils, from 0.3 mils to 3.0 mils, from 0.3 mils to 2.0 mils, from 0.3 mils to 1.0 mil, from 0.3 mil to 0.8 mil, from 0.2 mil to 0.6 mil, from 0.3 mil to 0.4 mil, from 1.0 mil to 10.0 mils, from 1.0 mil to 9.0 mils, from 1.0 mil to 8.0 mils, from 1.0 mil to 7.0 mils, from 1.0 mil to 6.0, from 1.0 mil to 5.0 mils, from 1.0 mil to 4.0 mils, from 1.0 mil to 3.0 mils, from 1.0 mil to 2.0 mils, or any combination of these ranges.

Without being bound by theory, the above described LLDPE provides an improved balance of stretch and puncture due to the short chain branching distribution as defined by the iCCD detailed above i.e., soluble fraction, copolymer fraction, and high density fraction. In one or more embodiments, the cast film has a Highlight (200%) stretch force of at least 50 lbf at a width of 20 in and a thickness of 0.5 mil. Moreover, the cast film may have an on-pallet puncture resistance of at least about 14 lbf, and Highlight ultimate stretch of at least about 370% at 0.5 mil thickness.

In other embodiments, the cast film may have an on-pallet puncture resistance of at least 11 lbf, and a Highlight ultimate stretch of at least 340% at a 0.7 mil thickness. Furthermore, the cast film may have a Highlight (200%) stretch force of at least 59 lbf at a width of 20 in and a thickness of 0.7 mil.

Like the blown film, various film configurations are contemplated for the cast films. For example, the cast film may be a multilayer film or a monolayer film. Moreover, the cast film may contain additional components, such as ethylene based polymers. The above described ethylene based polymers, in some embodiments, can be used in more than one layer of the film. Other layers within a multilayer film of the present disclosure can comprise, in various embodiments, a polymer selected from the following: the above described ethylene based polymers, a LLDPE, a VLDPE (a very low density polyethylene), a MDPE, a LDPE, a HDPE, a HMWHDPE (a high molecular weight HDPE), a propylene-based polymer, a polyolefin plastomer (POP), a polyolefin elastomer (POE), an olefin block copolymer (OBC), an ethylene vinyl acetate, an ethylene acrylic acid, an ethylene methacrylic acid, an ethylene methyl acrylate, an ethylene ethyl acrylate, an ethylene butyl acrylate, an isobutylene, a maleic anhydride-grafted polyolefin, an ionomer of any of the foregoing, or a combination thereof. In some embodiments, a multilayer film of the present disclosure can comprise one or more tie layers known to those of skill in the art. Some additional components or layers commonly employed in the art may include (but are not limited to) other LLDPEs, other LLDPEs blended with amorphous hydrocarbons and/or other substances known in the art to enhance adhesion ('cling') to the pallet, polypropylene homopolymer, and polypropylene copolymer with polyethylene.

In one embodiment, the LLDPE is blended with LDPE. In one or more embodiments, the cast film, which may be a monolayer or multilayer film, may comprise a blend having 5 to 95 wt % of the LLDPE, 5 to 50 wt % of the LLDPE, 5 to 25 wt % of the LLDPE, 5 to 10 wt % of the LLDPE, 10 to 95 wt % of the LLDPE, 10 to 50 wt % of the LLDPE, 10 to 25 wt % of the LLDPE, 50 to 95 wt % of the LLDPE, or 60 to 90 wt % of the LLDPE, or 70 to 85 wt % of the LLDPE. Conversely, the blend may comprise 5 to 50 wt % of the LDPE, or 10 to 40 wt % LDPE, or from 15 to 30 wt % LDPE.

Test Methods

Density

Samples for density measurements were prepared according to ASTM D 4703-10. Samples were pressed at 374° F. (190° C.), for five minutes, at 10,000 psi (68 MPa). The temperature was maintained at 374° F. (190° C.) for the above five minutes, and then the pressure was increased to 30,000 psi (207 MPa) for three minutes. This was followed by a one minute hold at 70° F. (21° C.) and 30,000 psi (207 MPa). Measurements were made within one hour of sample pressing using ASTM D792-08, Method B.

Melt Index ($I_2$ and $I_{10}$)

Melt index (MI), or $I_2$, was measured in accordance with ASTM D1238-13, Condition 190° C./2.16 kg, Procedure D (multi-weight procedure), and was reported in grams eluted per 10 minutes (g/10 min). I10 was measured during the same procedure using the 10 kg load condition, and was also reported in grams eluted per 10 minutes (g/10 min).

Gel Permeation Chromatography (GPC)

For gel permeation chromatography (GPC), the chromatographic system consisted of a PolymerChar GPC-IR (Valencia, Spain) high temperature GPC chromatograph equipped with an internal IR5 detector. The autosampler oven compartment was set at 160° Celsius and the column compartment was set at 150° Celsius. The columns used were 3 Agilent "Mixed B" 30 cm 10-micron linear mixed-bed columns and a 10-µm pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 g/mol and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000 g/mol, and 0.05 grams in 50 milliliters of solvent for molecular weights less than 1,000,000 g/mol. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene} = A \times (M_{polystyrene})^B \quad \text{(EQ 1)}$$

where M is the molecular weight, A has a value of 0.4315 and B is equal to 1.0.

A fifth order polynomial was used to fit the respective polyethylene-equivalent calibration points. A small adjustment to A (from approximately 0.415 to 0.44) was made to correct for column resolution and band-broadening effects such that NIST standard NBS 1475 is obtained at 52,000 g/mol Mw.

The total plate count of the GPC column set was performed with Eicosane (prepared at 0.04 g in 50 milliliters of trichlorobenzene (TCB) and dissolved for 20 minutes with gentle agitation.) The plate count (Equation 2) and symmetry (Equation 3) was measured on a 200 microliter injection according to the following equations:

$$\text{Plate Count} = 5.54 * \left( \frac{RV_{Peak\ Max}}{\text{Peak Width at } \frac{1}{2}\text{height}} \right)^2 \quad \text{(EQ 2)}$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad (EQ\ 3)$$

where RV is the retention volume in milliliters and the peak width is in milliliters, peak max is the maximum position of the peak, one tenth height is ⅒ height of the peak maximum, rear peak refers to the peak tail at later retention volumes than the peak max, and front peak refers to the peak front at earlier retention volumes than the peak max. The plate count for the chromatographic system should be greater than 24,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of Mn, Mw, and Mz were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$M_n = \frac{\sum_i IR_i}{\sum_i (IR_i / M_{polyethylene_i})} \quad (EQ\ 4)$$

$$M_w = \frac{\sum_i (IR_i * M_{polyethylene_i})}{\sum_i IR_i} \quad (EQ\ 5)$$

$$M_z = \frac{\sum_i (IR_i * M_{polyethylene_i}^2)}{\sum_i (IR_i * M_{polyethylene_i})} \quad (EQ\ 6)$$

In order to monitor the deviations over time, a flowrate marker (decane) was introduced into each sample via a micropump controlled with the PolymerChar GPC-IR system. This flowrate marker was used to linearly correct the flowrate for each sample by alignment of the respective decane peak within the sample to that of the decane peak within the narrow standards calibration. Any changes in the time of the decane marker peak are then assumed to be related to a linear shift in both flowrate and chromatographic slope. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (as a measurement of the calibration slope) is calculated as Equation 7. Processing of the flow marker peak was done via the PolymerChar GPCOne™ Software.

$$Flowrate_{effective} = Flowrate_{nominal} \times \frac{FlowMarker_{Calibration}}{FlowMarker_{Observed}} \quad (EQ\ 7)$$

Improved Method for Comonomer Content Distribution (iCCD) Analysis

Improved method for comonomer content distribution (iCCD) analysis was performed with Crystallization Elution Fractionation instrumentation (CEF) (PolymerChar, Spain) equipped with a IR-5 detector (PolymerChar, Spain) and two angle light scattering detector Model 2040 (Precision Detectors, currently Agilent Technologies). A guard column packed with 20-27 micron glass (MoSCi Corporation, USA) in a 10 cm (length) by ¼" (ID) (0.635 cm ID) stainless was installed just before the IR-5 detector in the detector oven. Ortho-dichlorobenzene (ODCB, 99% anhydrous grade or technical grade) was used. Silica gel 40 (particle size 0.2~0.5 mm, catalogue number 10181-3) from EMD Chemicals was obtained (can be used to pack into columns to further purify ODCB, the packed columns are installed after the outlet of Agilent pump). The CEF instrument is equipped with an autosampler with $N_2$ purging capability. ODCB is sparged with dried nitrogen ($N_2$) for one hour before use. Sample preparation was done with autosampler at 4 mg/mL (unless otherwise specified) under shaking at 160° C. for 1 hour. The injection volume was 300 μL. The temperature profile of iCCD was: crystallization at 3° C./min from 105° C. to 30° C., the thermal equilibrium at 30° C. for 2 minute (including Soluble Fraction Elution Time being set as 2 minutes), and elution at 3° C./min from 30° C. to 140° C. The flow rate during crystallization is 0.0 ml/min. The flow rate during elution is 0.50 ml/min. The data was collected at one data point/second.

The iCCD column was packed with gold coated nickel particles (Bright 7GNM8-NiS, Nippon Chemical Industrial Co.) in a 15 cm (length) by ¼" (ID) (0.635 cm) stainless tubing. The column packing and conditioning were with a slurry method according to the reference (Cong, R.; Parrott, A.; Hollis, C.; Cheatham, M., US Publication US20180172648A1). The final pressure with TCB slurry packing was 150 Bars.

Column temperature calibration was performed by using a mixture of the Reference Material Linear homopolymer polyethylene (having zero comonomer content, Melt index (I2) of 1.0, polydispersity Mw/Mn approximately 2.6 by conventional gel permeation chromatography, 1.0 mg/mL) and Eicosane (2 mg/mL) in ODCB. The iCCD temperature calibration consisted of four steps: (1) Calculating the delay volume defined as the temperature offset between the measured peak elution temperature of Eicosane minus 30.00° C.; (2) Subtracting the temperature offset of the elution temperature from the iCCD raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that the linear homopolymer polyethylene reference had a peak temperature at 101.0° C., and Eicosane had a peak temperature of 30.0° C.; (4) For the soluble fraction measured isothermally at 30° C., the elution temperature below 30.0° C. is extrapolated linearly by using the elution heating rate of 3° C./min according to the reference (US20180172648A1).

The comonomer content versus elution temperature of iCCD was constructed by using 12 reference materials (ethylene homopolymer and ethylene-octene random copolymer made with single site metallocene catalyst, having ethylene equivalent weight average molecular weight ranging from 35,000 to 128,000 g/mol). All of these reference materials were analyzed in the same way as specified previously at 4 mg/mL. The modeling of the reported elution peak temperatures as a function of octene mole % using linear regression resulted in Equation 8 (EQ8) for which $R^2$ was 0.978. The elution peak is the temperature with the highest weight fraction eluting.

$$\text{(Elution Temperature in Degrees C.)} = -6.3515 \times \text{(Octene Mol \%)} + 101.000 \qquad \text{EQ 8}$$

For the whole resin, integration windows are set to integrate all the weight fractions in the elution temperature (temperature calibration is specified above) range from 23.0° C. to 115° C. The weight percentage of the high density fraction of the resin (HDF) is defined by the following Equation 9 (EQ9), the soluble fraction of the resin (SF) is defined by the following Equation 10 (EQ10), and the copolymer fraction (CF) is defined by the following Equation 11 (EQ11).

$$HDF = \frac{\left(\text{integrated area of elution window } [95, 115]^\circ \text{ C.}\right)}{\left(\begin{array}{c}\text{integrated area of entire}\\ \text{elution window } [23, 115]^\circ \text{C.}\end{array}\right)} \times 100\% \qquad \text{EQ 9}$$

$$SF = \frac{\left(\text{integrated area of elution window } [25, 35]^\circ \text{ C.}\right)}{\left(\begin{array}{c}\text{integrated area of entire}\\ \text{elution window } [23, 115]^\circ \text{ C.}\end{array}\right)} \times 100\% \qquad \text{EQ 10}$$

$$CF = (1 - HDF - SF) \times 100\% \qquad \text{EQ 11}$$

Ultimate Stretch

Ultimate stretch was determined according to the Highlight Test Stand, commercially available from Highlight Industries. The test is performed as follows: The film roll (width 20 inches, thickness as specified below) is placed on the unwind section of the machine and the film is unwound through a set of rollers, with the second roller maintaining a constant rotation rate (corresponding to a 180 ft/min film rate) while the first roller's rotation rate is continuously decreased. The film thus receives increasing strain and increasing force, and the test continues until it reached its ultimate stretch point (strain amount at film failure between the stretch rollers). Load cells measured the amount of force applied and a calculation using the ratio of roller rotational speeds was made to determine the amount of stretch present in the film. Three tests were conducted and averaged together to obtain the average ultimate stretch value. During each test, the load required to stretch the film is recorded by a load cell. The stretch force recorded at 200% stretch in each test is also averaged below.

On-Pallet Puncture

On-pallet puncture was determined utilizing a Lantech stretch wrapper. Respective 20-inch width films were wrapped on the stretch wrapper, which was set to 250% stretch. The rectangular pallet (approximately 35×44 in) was wrapped at 10 rpm, with the film wrapping a constant portion of the test pallet, rather than moving up and down. The test varies the dancer bar "F2" setting (representing the tension maintained in the film between the pallet and the final stretch roller), which can be changed in 0.5 lbf increments from 7 lbf to 18 lbf. Once the wrapper reaches 250% pre-stretch, the pallet wraps over a 2"×2" rectangular prism steel protrusion extending from one corner of the pallet (parallel to the short sides of the rectangle) to a distance of 6". The protrusion's cross-section is beveled with a radius of curvature of about 4 mm. The probe is smoothed to remove sharp edges, so that the edges had a radius of curvature of about 2 mm. Each trial consisted of wrapping the pallet three complete revolutions, thus covering the probe three times, and evaluating whether the probe punctured the film. Any breakage of the film during any of the wraps is considered a failure at that force to load setting. Depending on the performance of the film at the load setting (i.e. passed or failed), the force to load is adjusted up or down, and the test is repeated at the new load setting. The reported load is the highest load for which 50% of the tests pass (3 successes out of up to 6 attempts). The entire process is conducted three times, and the average is reported as the on-pallet puncture value.

Table 2 below provides the equipment and settings used in this method.

TABLE 2

Cast Film Lantech SHC Film Test Wrapper Conditions.

| Equipment: | Lantech SHC Film Test Wrapper |
|---|---|
| Pre-stretch: | 250% |
| Turntable Speed | 10 rpm |
| Pallet Geometry | 35" by 44" rectangle |
| Force to Load (F2) | Variable |
| Probe Type | 2" × 2" beveled blunt rod |
| Probe Protrusion Distance | 6" |

Total Haze

The total haze was measured in accordance with ASTM D1003.

Dart

The film Dart Drop test determines the energy that causes a plastic film to fail, under specified conditions of impact by a free falling dart. The test result is the energy, expressed in terms of the weight of the missile falling from a specified height, which would result in the failure of 50% of the specimens tested.

Dart Impact Strength (Dart) is measured according to ASTM D1709, Method A, using a 26 inch±0.4 inches (66 cm±1 cm) drop height and a polished aluminum hemispherical head of 38.10±0.13 mm in diameter.

EXAMPLES

The following examples are provided to illustrate embodiments described in this disclosure and are not intended to limit the scope of this disclosure or its appended claims.

Catalyst Preparation Procedures

The following lists catalyst preparation procedures for Comparative Examples A-C and Inventive Examples 1-9.

Ziegler Natta Catalysts (Without Zinc)—Comparative Examples A-C

To approximately 220 lb of 0.20 M $MgCl_2$ slurry was added 12.86 lb of $(C_2H_5)AlCl_2$ (EADC) solution (15 wt. % in heptanes), followed by agitation for 8 hours. Then 6.64 lb of a mixture of $TiCl_4/VOCl_3$ (1.10 wt % Ti and 2.36 wt % V in heptanes) was added, followed by a solution of $Zr(TMHD)_4$ (Zirconium tetrakis(2,2,6,6-tetramethyl-3,5-heptanedionate) (5.19 lb of 1.34 wt % Zr solution in heptanes). These two additions were performed sequentially within 1 hour of each other. The resulting catalyst premix was aged with agitation for an additional 8 h prior to use.

Ziegler Natta Catalysts (with Zinc)—Inventive Examples 1-3 and 9

To approximately 210 lb of 0.20 M $MgCl_2$ slurry was added 12.52 lb of $(C_2H_5)AlCl_2$ (EADC) solution (15 wt. % in heptanes), followed by agitation for 4 hours. A solution of $Zn(EHA)_2$ (zinc 2-ethylhexanoate) (3.81 lb of 5.0 wt % Zn in Isopar-E) was added followed by agitation for 4 hours. Then 6.34 lb of a mixture of $TiCl_4/VOCl_3$ (1.10 wt % Ti and 2.36 wt % V in heptanes) was added. The resulting catalyst premix was aged with agitation for an additional 8 h prior to use.

Ziegler Natta Catalysts (with Zinc)—Inventive Examples 4-7

To approximately 220 lb of 0.20 M $MgCl_2$ slurry was added 13.12 lb of $(C_2H_5)AlCl_2$ (EADC) solution (15 wt. % in heptanes), followed by agitation for 4 hours. A solution of $Zn(EHA)_2$ (zinc 2-ethylhexanoate) (3.99 lb of 5.0 wt % Zn in Isopar-E) was added followed by agitation for 4 hours. Then 6.64 lb of a mixture of $TiCl_4/VOCl_3$ (1.10 wt % Ti and 2.36 wt % V in heptanes) was added. The resulting catalyst premix was aged with agitation for an additional 8 h prior to use.

Ziegler Natta Catalysts (with Zinc)—Inventive Example 8

To approximately 215 lb of 0.20 M $MgCl_2$ slurry was added 12.82 lb of $(C_2H_5)AlCl_2$ (EADC) solution (15 wt. % in heptanes), followed by agitation for 4 hours. A solution of $Zn(EHA)_2$ (zinc 2-ethylhexanoate) (3.90 lb of 5.0 wt % Zn in Isopar-E) was added followed by agitation for 4 hours. Then 6.49 lb of a mixture of $TiCl_4/VOCl_3$ (1.10 wt % Ti and 2.36 wt % V in heptanes) was added. The resulting catalyst premix was aged with agitation for an additional 8 h prior to use.

Production of Comparative Examples A-C and Inventive Examples 1-9

Comparative Examples A-C and Inventive Examples 1-9 were produced via a solution polymerization according to the following exemplary process. All raw materials (monomer) and the process solvent (a narrow boiling range high-purity isoparaffinic solvent, Isopar-E) were purified with molecular sieves before introduction into the reaction environment. Hydrogen was supplied in pressurized cylinders as a high purity grade and was not further purified. The reactor monomer feed stream was pressurized via a mechanical compressor to above reaction pressure. The solvent feed was pressurized via a pump to above reaction pressure. The individual catalyst components was manually batch diluted to specified component concentrations with purified solvent and pressured to above reaction pressure. All reaction feed flows were measured with mass flow meters and independently controlled with computer automated valve control systems.

The continuous solution polymerization reactor was a liquid full, non-adiabatic, isothermal, circulating, loop reactor which mimics a continuously stirred tank reactor (CSTR) with heat removal. Independent control of all fresh solvent, monomer, hydrogen, and catalyst component feeds was possible. The total fresh feed stream to the reactor (solvent, monomer, and hydrogen) was temperature controlled by passing the feed stream through a heat exchanger. The catalyst components were injected into the polymerization reactor through a specially designed injection stinger and were combined into one mixed catalyst/cocatalyst feed stream prior to injection into the reactor. The primary catalyst component feed was computer controlled to maintain the reactor monomer concentration at a specified target. The cocatalyst component was fed based on calculated specified molar ratios to the primary catalyst component. Immediately following each fresh injection location (either feed or catalyst), the feed streams were mixed with the circulating polymerization reactor contents with static mixing elements. The contents of the reactor were continuously circulated through heat exchangers responsible for removing much of the heat of reaction and with the temperature of the coolant side responsible for maintaining an isothermal reaction environment at the specified temperature. Circulation around the reactor loop was provided by a positive displacement pump.

The final reactor effluent entered a zone where it was deactivated with the addition of and reaction with water. At this same reactor exit location, other additives were added (such as an acid scavenging agent and anti-oxidants). The stream then went through a static mixer to disperse the post reactor additive components.

Following catalyst deactivation and additive addition, the reactor effluent entered a devolatization system where the polymer was removed from the non-polymer stream. The isolated polymer melt was pelletized and collected. The non-polymer stream passed through various pieces of equipment which separated most of the ethylene which is removed from the system. Most of the solvent and unreacted monomer was recycled back to the reactor after passing through a purification system. A small amount of solvent and monomer was purged from the process.

Tables 3A and 3B summarizes the polymerization conditions for the synthesis of Comparative Examples A-C and Inventive Examples 1-9, respectively. Additives used in these polymerizations were 1000 ppm IRGAFOS™ 168 (which is tris(2,4 di-tert-butylphenyl)phosphite), 250 ppm IRGANOX™ 1076 (which is octadecyl-3-(3,5-di-tert-butyl-4-hydroxyphenyl)propionate)), and 200 ppm IRGANOX™ 1010 (tetrakis(methylene(3,5-di-tert-butyl-4-hydroxyhydrocinnamate))methane). IRGAFOS™ 168 and IRGANOX™ 1076 are commercially available from BASF. IRGANOX™ 1010 is available from BASF. All of these examples were produced in a single reactor with 1-hexene as the comonomer.

TABLE 3A

Polymerization Conditions for Comparative Examples A-C.

| Resin | Comp. Example A | Comp. Example B | Comp. Example C |
|---|---|---|---|
| Feed Solvent/Ethylene Mass Flow Ratio (g/g) | 3.7 | 3.7 | 3.5 |
| Feed Comonomer/Ethylene Mass Flow Ratio (g/g) | 0.382 | 0.384 | 0.424 |
| Feed Hydrogen/Ethylene Mass Flow Ratio (g/g) | 3.3E−05 | 2.8E−05 | 5.9E−05 |
| Temp. (° C.) | 190 | 190 | 192 |
| Pressure (barg) | 50 | 50 | 50 |
| Ethylene Conversion (%) | 92.4 | 92.7 | 92.5 |
| Catalyst Type | Z-N** (no Zinc) | Z-N (no Zinc) | Z-N (no Zinc) |
| Co-Catalyst Type | TEA* | TEA | TEA |
| Co-Catalyst to Catalyst Molar Ratio (Al/Ti) (mol/mol) | 12.0 | 12.0 | 12.6 |
| Residence Time (min) | 7.5 | 7.8 | 5.9 |

*TEA is tri-ethyl-aluminum
**Z-N is Ziegler Natta

TABLE 3B

Polymerization Conditions for Inventive Examples 1-9.

| Resin | Inv. Ex. 1 (IE1) | Inv. Ex. 2 (IE2) | Inv. Ex. 3 (IE3) | Inv. Ex. 4 (IE 4) | Inv. Ex. 5 (IE5) | Inv. Ex. 6 (IE6) | Inv. Ex. 7 (IE7) | Inv. Ex. 8 (IE8) | Inv. Ex. 9 (IE9) |
|---|---|---|---|---|---|---|---|---|---|
| Feed Solvent/ Ethylene Mass Flow Ratio (g/g) | 3.7 | 3.7 | 3.5 | 3.2 | 3.4 | 3.6 | 3.6 | 3.1 | 3.2 |
| Feed Comonomer/ Ethylene Mass Flow Ratio (g/g) | 0.414 | 0.406 | 0.539 | 0.864 | 0.595 | 0.470 | 0.437 | 0.409 | 0.399 |
| Feed Hydrogen/ Ethylene Mass Flow Ratio (g/g) | 4.3E-05 | 8.5E-05 | 8.2E-05 | 3.1E-05 | 3.4E-05 | 5.6E-05 | 4.0E-05 | 7.1E-05 | 6.9E-05 |
| Temp. (° C.) | 190 | 190 | 190 | 190 | 190 | 190 | 190 | 190 | 190 |
| Pressure (barg) | 50 | 50 | 50 | 50 | 50 | 50 | 50 | 50 | 50 |
| Ethylene Conversion (%) | 92.5 | 92.6 | 92.6 | 92.5 | 92.7 | 92.4 | 92.7 | 93.7 | 93.5 |
| Catalyst Type | Z-N (with Zinc) | Z-N (with Zinc) | Z-N (with Zinc) | Z-N (with Zinc) | Z-N (with Zinc) | Z-N (with Zinc) | Z-N (with Zinc) | Z-N (with Zinc) | Z-N (with Zinc) |
| Co-Catalyst Type | TEA | TEA | TEA | TEA | TEA | TEA | TEA | TEA | TEA |
| Co-Catalyst to Catalyst Molar Ratio (Al/Ti) (mol/mol) | 13.0 | 13.0 | 13.0 | 14.0 | 14.0 | 14.0 | 14.0 | 13.0 | 14.0 |
| Residence Time (min) | 7.8 | 7.8 | 8.0 | 8.3 | 7.9 | 7.7 | 7.7 | 9.1 | 8.8 |

Blown Film Examples

Table 4 includes the properties for the resins used in the blown film examples which follow. As shown, Table 4 includes properties for the resin examples of Tables 3A and 3B as well as the properties of other conventional resins (Comp. Examples D-G) listed below, all of which are available from Dow Inc., Midland, MI.

TABLE 4

Properties of Resins Used in Blown Films.

| Sample | $I_2$ (190° C.) | Density (g/cc) | $I_{10}/I_2$ (190° C.) | MWD or Mw/Mn (conv.) | Soluble Fraction (wt %) | Copolymer fraction (wt %) | High Density Fraction (wt %) |
|---|---|---|---|---|---|---|---|
| Comp. Example A (CA) | 0.87 | 0.918 | 7.20 | 3.26 | 2.0 | 87.2 | 10.9 |
| Comp. Example B (CB) | 0.74 | 0.917 | 7.19 | 3.29 | 1.9 | 86.7 | 11.4 |
| Comp. Example C (CC) | 1.32 | 0.919 | 7.02 | 3.02 | 1.9 | 87.0 | 11.1 |
| Comp. Example D (CD) ATTANE SL 4100 | 1.01 | 0.912 | 7.86 | 4.06 | 6.7 | 86.6 | 6.7 |
| Comp. Example E (CE) DOWLEX 4056G | 1.28 | 0.916 | 7.67 | 3.92 | 3.9 | 89.0 | 7.0 |
| Comp. Example F (CF) DOWLEX 2645 | 0.88 | 0.917 | 7.89 | 4.21 | 3.1 | 88.8 | 8.0 |
| Comp. Example G (CG) ATTANE SL 4102 | 0.94 | 0.905 | 8.43 | 4.47 | 13.3 | 79.5 | 7.3 |

TABLE 4-continued

Properties of Resins Used in Blown Films.

| Sample | I$_2$ (190° C.) | Density (g/cc) | I$_{10}$/I$_2$ (190° C.) | MWD or Mw/Mn (conv.) | Soluble Fraction (wt %) | Copolymer fraction (wt %) | High Density Fraction (wt %) |
|---|---|---|---|---|---|---|---|
| Inventive Example 1 (IE1) | 0.72 | 0.916 | 7.36 | 3.52 | 1.5 | 91.9 | 6.6 |
| Inventive Example 2 (IE2) | 0.85 | 0.918 | 7.38 | 3.43 | 1.6 | 92.1 | 6.3 |
| Inventive Example 3 (IE3) | 1.04 | 0.912 | 7.55 | 3.48 | 4.0 | 91.3 | 4.7 |
| Inventive Example 4 (IE4) | 0.99 | 0.906 | 7.22 | 3.54 | 9.5 | 86.5 | 4.0 |
| Inventive Example 5 (IE5) | 0.97 | 0.913 | 7.02 | 3.34 | 3.0 | 92.0 | 5.0 |
| Inventive Example 6 (IE6) | 1.29 | 0.918 | 6.77 | 3.20 | 1.6 | 92.3 | 6.1 |
| Inventive Example 7 (IE7) | 0.85 | 0.919 | 6.94 | 3.29 | 1.1 | 92.2 | 6.7 |

Blown monolayer films with 100 wt % LLDPE were made on an "8 inch die" with a polyethylene "Davis Standard Barrier II screw." (single screw extruder). External cooling by an air ring and internal bubble cooling were used. Film thickness is controlled within ±10% at 2 mils by adjusting the nip roller speed. The lay flat of the bubble is 31 inches wide. The films are wound up into a roll. General blown film parameters, used to produce each blown film, are shown in Table 5A. The temperatures are the temperatures closest to the pellet hopper (Barrel 1), and in increasing order, as the polymer was extruded through the die.

The blown films listed in Tables 5B and 5C as follows were utilizing the parameters provided in the same tables.

TABLE 5A

Blown Film Fabrication Conditions for Films.

| | |
|---|---|
| Blow up ratio (BUR)/Die gap (mil) | 2.5/70 |
| Temperature profile (° F.) | |
| Barrel 1/Barrel 2/Barrel 3/Barrel 4/Barrel 5 | 310/330/380/375/375 |
| Screen Temperature | 450 |
| Adapter/Block/Lower Die/Inner Die/Upper Die | 450/450/450/450/450 |
| Frost line height (in) | 35 |

TABLE 5B

Blown Film Parameters and Properties for Comparative Blown Films.

| Blown Film Sample | CBF1 | CBF2 | CBF3 | CBF4 | CBF5 | CBF6 | CBF7 |
|---|---|---|---|---|---|---|---|
| Tables 3A & 4 Resins | CA | CB | CC | CD | CE | CF | CG |
| Ambient Temperature (° F.) | 63 | 63 | 59 | 68 | 68 | 59 | 62 |
| Melt Temperature (° F.) | 451 | 460 | 441 | 442 | 444 | 451 | 405 |
| Screen Pressure (psi) | 3,895 | 4,278 | 3,674 | 3,986 | 3,126 | 4,203 | 4,635 |
| Output (lb/hr), Max Output | 249 | 248 | 249 | 250 | 250 | 250 | 250 |
| Thickness (mil) | 2.0 | 2.2 | 2.1 | 2.0 | 2.0 | 2.0 | 2.0 |
| Haze (%) | 8.6 | 9.2 | 9.4 | 6.6 | 9.7 | 10.1 | 8.7 |
| Haze Internal (%) | 3.0 | 3.3 | 3.1 | 3.0 | 4.5 | 3.7 | 2.8 |
| Dart (g) | 762 | 891 | 570 | 1,116 | 696 | 624 | 1,188 |

CBF = Comparative Blown Film

TABLE 5C

Blown Film Properties for Inventive Blown Films.

| Blown Film Sample | IBF1 | IBF2 | IBF3 | IBF4 | IBF5 | IBF6 | IBF7 |
|---|---|---|---|---|---|---|---|
| Tables 3B & 4 Resins | IE1 | IE2 | IE3 | IE4 | IE5 | IE6 | IE7 |
| Ambient Temperature (° F.) | 63 | 63 | 64 | 62 | 67 | 68 | 59 |
| Melt Temperature (° F.) | 454 | 450 | 413 | 414 | 446 | 441 | 446 |
| Screen Pressure (psi) | 4,580 | 4,296 | 4,311 | 5,058 | 4,344 | 3,974 | 4,329 |
| Output (lb/hr), Max Output | 248 | 250 | 250 | 250 | 253 | 252 | 249 |
| Total Haze (%) | 8.2 | 7.5 | 9.9 | 7.0 | 5.4 | 7.0 | 7.1 |
| Haze Internal (%) | 2.9 | 3.0 | 3.0 | 2.1 | 2.0 | 2.8 | 2.9 |
| Dart (g) | 1,056 | 981 | 1,515 | 1,872 | 1,425 | 600 | 801 |

*IBF = Inventive Blown Film

Referring to Tables 5A and 5B above, inventive blown film IBF2 showed a much better (higher) dart and improved (lower) haze than comparative blown film CBF1, which had similar density and melt index. Without being bound by theory, it is believed that this improved balance of dart and total haze performance is due in part to the short chain branching distribution defined by the soluble fraction, copolymer fraction, and high density fraction in iCCD.

The improvements in dart and haze are also demonstrated compared to conventional blown films CBF4-CBF7. For example, when comparing inventive blown film IBF4 to comparative blown film CBF7, which both had similar density and melt index, IBF4 demonstrated better total haze and dart performance. Similarly, when comparing IBF5 and CBF4, which both had similar density and melt index, IBF5 demonstrated better haze and dart performance. When comparing IBF7 to CBF6, which both had the same density, IBF7 demonstrated better total haze and dart performance.

Cast Films

Table 6 below provides resins and resin properties for resins incorporated into or suitable for use in cast films. As shown in Table 6, Comparative Example H (CH) is DOWLEX™ GM 8480F, available from The Dow Chemical Company, Midland, MI. Comparative Example I (CI) is ELITE 5230G, which is also available from The Dow Chemical Company, Midland, MI. The inventive cast films include Inventive Example Resin 8 (IE8); however, Inventive Example Resin 9 (IE9) is another resin which is suitable for use in a cast film. The polymerization conditions for IE8 and IE9 are provided in Table 3B.

TABLE 6

Properties of Resins Used in Cast Films.

| Resin Sample | $I_2$ | Density | $I_{10}/I_2$ | MWD (Mw/Mn conv.) | Soluble Fraction (wt %) | Copolymer fraction | High Density Fraction (wt %) | Ratio of Soluble Fraction to High Density Fraction | Max. Elution Peak Height (Temp. of Max. Peak Height) (° C.) |
|---|---|---|---|---|---|---|---|---|---|
| Inventive Example 8 (IE8) | 2.91 | 0.917 | 6.72 | 3.17 | 2.1 | 92.9 | 4.5 | 0.43 | 82.8 |
| Inventive Example 9 (IE9) | 3.35 | 0.917 | 6.86 | 3.06 | 2.8 | 92.6 | 4.6 | 0.61 | 81.0 |
| Comp. Example H (CH) DOWLEX GM 8480 | 3.00 | 0.917 | 6.95 | 3.35 | 4.8 | 88.2 | 7.0 | 0.69 | 80.9 |
| Comp. Example I (CI) ELITE 5230 | 3.98 | 0.917 | 7.00 | 3.23 | 2.3 | 93.5 | 4.2 | 0.55 | 77.0 |

Cast Stretch Film Fabrication

Using the resins listed in Table 6 above, five layer (A/B/C/D/E) films were made in a 5 layer Egan-Davis Standard cast extrusion line as follows: The die gap was 20 mil, the melt curtain used was 3.5 in, the cast roll was kept at 70 F, the die was maintained at 550 F, and line speed was manipulated to reach the target film thickness. One extruder (A) delivered ATTANE 4404 to make one surface layer (the cling layer), while the remaining extruders delivered IE8, CH or CI. Inventive Cast Films (ICF1 and ICF2) used IE8 and Comparative Cast Films CCF1 and CCF2 used CH resin, and CCF3 used CI. ATTANE 4404G is a polyethylene resin commercially available from The Dow Chemical Company with an I2 of 4.0 g/10 min and a density of 0.904 g/cc. The target layer structure was as follows (in wt %): 10/23/30/26/11. The A layer (cling layer) would face the core of the roll during the winding process. Table 7 as follows provides the target film thicknesses, throughput, extruder temperatures, and line speed.

TABLE 7

Cast Extrusion Parameters.

| Sample | Resin | Target Thickness (mil) | Throughput (lb/hr) | A Extruder Temperature (° F.) | Average B-E Extruder Temperature (° F.) | Line Speed (ft/min) |
|---|---|---|---|---|---|---|
| ICF1 | IE8 | 0.5 | 327 | 540 | 560 | 575 |
| ICF2 | IE8 | 0.7 | 313 | 540 | 560 | 480 |
| CCF1 | CH | 0.5 | 310 | 540 | 560 | 625 |
| CCF2 | CH | 0.7 | 312 | 540 | 560 | 480 |
| CCF3 | CI | 0.5 | 295 | 520 | 550 | 700 |

After production of the cast films in Table 7, the cast films were evaluated based on Ultimate Stretch, Highlight (200%) Stretch Force, and On-Pallet Puncture. The results of these tests are provided in Table 8.

TABLE 8

Cast Film Results.

| Cast Film Sample | Thickness (mil) | Ultimate Stretch (%) | Highlight 200% Stretch Force (lbf) | On-Pallet Puncture (lbf) |
|---|---|---|---|---|
| ICF1 | 0.5 | 352 | 50.2 | 12.0 |
| ICF2 | 0.7 | 381 | 59.2 | 14.3 |
| CCF1 | 0.5 | 342 | 46.8 | 10.0 |
| CCF2 | 0.7 | 381 | 58.1 | 12.7 |
| CCF3 | 0.5 | 355 | 38.3 | 12.0 |

As shown above, the inventive cast films ICF1 and ICF2 demonstrated the best combination of Highlight ultimate stretch, Highlight 200% stretch force, and on-pallet puncture. When comparing ICF1 and CCF1, which have the same 0.5 mil thickness, it is clear that ICF1 had superior ultimate stretch, Highlight stretch force, and on-pallet puncture. When comparing ICF1 and CCF3, which also have the same thickness, puncture and ultimate stretch may be comparable; however, ICF1 has a significantly better Highlight stretch force performance. Similarly, when comparing 0.7 mil films ICF2 and CCF2, ICF2 demonstrate the combination of improved puncture and Highlight stretch force and equal ultimate stretch. Without being bound by theory, it is believed that these improvements are due to the changes in polymer structure described by the soluble fraction, copolymer fraction, the high density fraction, and the ratio of the soluble fraction to the high density fraction in Table 6.

A higher ultimate stretch is of benefit as it allows for wrapping pallets under a wider set of conditions, and minimizes film breakage during the wrapping process. A higher load at a particular amount of stretch (as measured by the Highlight 200% stretch force test) indicates a stiffer film, which correlates to superior failure resistance during pallet transport. A higher on-pallet puncture value is beneficial and indicative of greater overall film abuse resistance.

The invention claimed is:

1. A linear low density polyethylene (LLDPE) polymer comprising
   an LLDPE that is the polymerized reaction product of ethylene monomer and $C_3$-$C_{12}$ olefin comonomer;
   wherein the LLDPE has a density from 0.904 to 0.925 g/cc; a melt index ($I_2$) of 0.5 to 1.5 g/10 minutes when measured according to ASTM1238 under a load of 2.16 kg at a temperature of 190° C.; a melt flow ratio $I_{10}/I_2$ of 6.5 to 7.6, wherein $I_{10}$ is measured according to ASTM1238 at a temperature of 190° C. with 10 kg load; and a molecular weight distribution (MWD=Mw/Mn) of 2.5 to 3.6 when measured according to gel permeation chromatography;
   wherein the LLDPE comprises a short chain branching distribution defined by:
      a copolymer fraction greater than 85%, the copolymer fraction being defined of a ratio of the mass eluted at temperatures from greater than 35° C. to less than 95° C. to the total mass eluted when measured using an improved comonomer content distribution (iCCD) curve of mass eluted versus temperature;
      a high density fraction from 3.5 to 7.0%, the high density fraction being defined as a ratio of the mass eluted at temperatures at or above 95° C. to the total mass; and
      a soluble fraction from 1.0-10.0%, the soluble fraction being defined as a ratio of the mass eluted at temperatures at or below 35° C. to the total mass.

2. A blown film comprising the LLDPE of claim 1.

3. The blown film of claim 2, wherein the blown film has a dart value of at least 900 g when at a thickness of 2.0 mil and a resin density below 0.918 g/cc.

4. The blown film of claim 2, wherein the blown film has a total haze (%) between 4.5% and 10.5% at a thickness of 2.0 mil.

5. The blown film of claim 2, wherein the blown film has a thickness of 0.5 to 6 mils.

6. The blown film of claim 2, wherein the soluble fraction is 1 to 5%.

7. The blown film of claim 2, wherein the copolymer fraction is greater than 90%.

8. The blown film of claim 2, further comprising LDPE.

9. The blown film of claim 8, wherein the blown film comprises 50 to 95 wt % of the LLDPE, and 5 to 50 wt % of the LDPE.

10. The blown film of claim 2, wherein the blown film is a multilayer film.

11. The linear low density polyethylene (LLDPE) polymer of claim 1, wherein the LLDPE has a dart value of at least 600 g and a total haze (%) of at least 4.5 to 10.5%, when the LLDPE is incorporated into a blown film having a thickness of 2.0 mil.

12. The linear low density polyethylene (LLDPE) polymer of claim 1, wherein the LLDPE has a dart value of at least 900 g and a total haze (%) of at least 4.5 to 10.5% when the LLDPE is incorporated into a blown film having a thickness of 2.0 mil.

13. A linear low density polyethylene (LLDPE) polymer comprising
   an LLDPE that is the polymerized reaction product of ethylene monomer, and $C_3$-$C_{12}$ olefin comonomer;
   wherein the LLDPE comprises at least 50 mole percent (mol %) monomer units derived from ethylene and less than 50 mol % monomer units derived from $C_3$-$C_{12}$ olefin comonomer
   wherein the LLDPE has a density from 0.904 to 0.925 g/cc; a melt index ($I_2$) of 0.5 to 1.5 g/10 minutes when measured according to ASTM1238 under a load of 2.16 kg at a temperature of 190° C.; a melt flow ratio ($I_{10}/I_2$) of 6.5 to 7.6, wherein $I_{10}$ is measured according to ASTM1238 at a temperature of 190° C. with 10 kg load; and a molecular weight distribution (MWD=Mw/Mn) of 2.5 to 3.6 when measured according to gel permeation chromatography;
   wherein the LLDPE comprises a short chain branching distribution defined by:
      a copolymer fraction greater than 85%, the copolymer fraction being defined of a ratio of the mass eluted at temperatures from greater than 35° C. to less than 95° C. to the total mass eluted when measured using an improved comonomer content distribution (iCCD) curve of mass eluted versus temperature;
      a high density fraction from 0.5 to 8.0%, the high density fraction being defined as a ratio of the mass eluted at temperatures at or above 95° C. to the total mass; and
      a soluble fraction from 1.0% and 12.0%, the soluble fraction being defined as a ratio of the mass eluted at temperatures at or below 35° C. to the total mass; and
   wherein the LLDPE has a dart value of at least 900 g and a total haze (%) of at least 4.5 to 10.5% when the LLDPE is incorporated into a blown film having a thickness of 2.0 mil.

* * * * *